Feb. 15, 1966     E. F. WANTLAND     3,234,616
RING FASTENERS
Filed Feb. 16, 1965
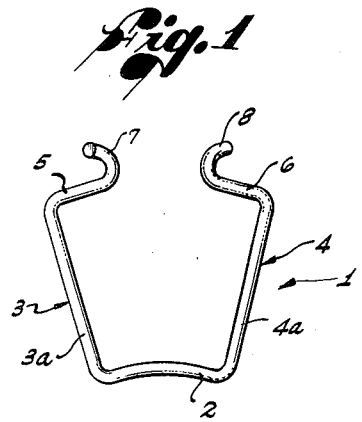
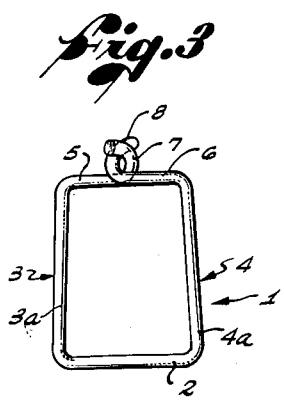
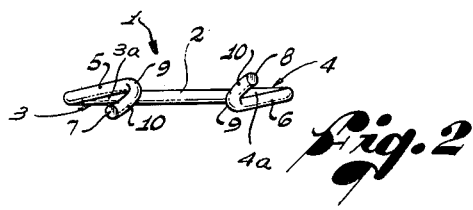
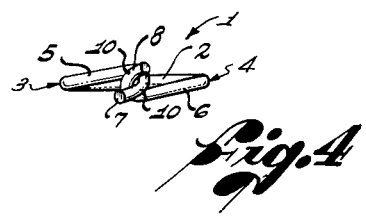
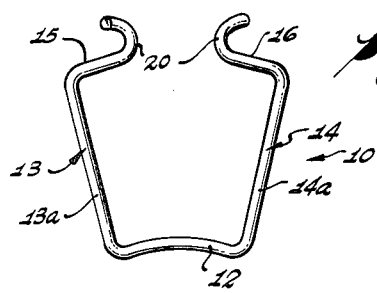
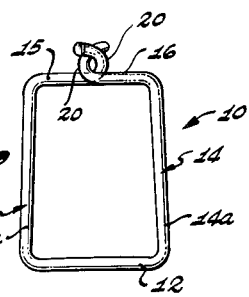
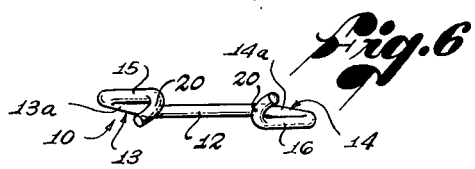
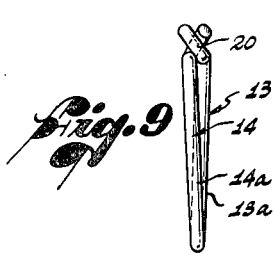
INVENTOR.
EDWARD F. WANTLAND
BY Forrest J. Lilly
ATTORNEY United States Patent Office 3,234,616
Patented Feb. 15, 1966

3,234,616
RING FASTENERS
Edward F. Wantland, Santa Monica, Calif.
(P.O. Box 219, Beverly Hills, Calif.)
Filed Feb. 16, 1965, Ser. No. 433,125
2 Claims. (Cl. 24—237)

This application is a continuation-in-part of my copending application, Serial No. 204,939, filed June 25, 1962, and entitled Ring Fasteners and now abandoned.

This invention relates to ring fasteners to hold objects together and is to be used in the driving tool disclosed in my Patent No. 3,066,304 or in a similar device.

There are certain uses for ring fasteners where the objects to be fastened are not always uniform in size or shape, and a simple automatic self-adjusting tightening action is desired. It is also beneficial to reduce the weight of the ring fastener to a minimum and yet not decrease its holding strength.

It is the object of this invention to provide a ring fastener equipped with a simple means to maintain ring tightness under varied conditions.

It is another object to provide a ring fastener which locks so that it will not pull apart under considerable pressure, permitting good security even if the cross-sectional area and weight of the ring are minimized.

It is another object to provide a ring fastener which can be used in inaccessible places to perform the functions desired.

The above and other features of the invention will be fully understood from the following detailed description and the accompanying drawing, in which:

FIG. 1 is a plan view of a presently preferred embodiment of the ring fastener of the invention;

FIG. 2 is an end elevational view of the fastener of FIG. 1;

FIG. 3 is a plan view of the fastener of FIG. 1 shown in closed position;

FIG. 4 is an end elevational view of the fastener of FIG. 1 shown in closed position;

FIG. 5 is a view similar to FIG. 1 but showing a modification;

FIG. 6 is an end elevational view of the ring fastener of FIG. 5;

FIG. 7 is a plan view of the fastener of FIG. 5 shown in closed position;

FIG. 8 is an end elevational view of the fastener of FIG. 5 shown in closed position;

FIG. 9 is a side elevational view of the fastener of FIG. 5 shown in closed position; and FIG. 10 is a fragmentary view showing an alternative form of hook end.

The ring fastener of the invention possesses particularly useful properties. In FIGS. 1-4 is shown the preferred embodiment of the present ring fastener. One specific use for this ring fastener is to attach expanded metal lath to steel studs or ceiling channels. There are many other uses.

The ring fastener, designated generally at 1, comprises a body formed preferably from a length of some such material as, for example, hard grade galvanized iron wire of 16 gauge (.0625 inch in diameter), having the capability of substantial deformability and elastic springback. The ring fastener includes a bight 2, preferably, though not necessarily, somewhat inwardly convex, and two arms 3 and 4 extending from opposite ends of the bight. The arms include side portions 3a and 4a which are normally angularly convergent toward the bight 2 and, as will be seen, integrally join the bight at their convergent ends. These arm portions 3a and 4a are substantially in a common plane that contains the bight 2. The other or outer ends of arm portions 3a and 4a join inwardly extending arm portions or shoulders 5 and 6, formed, in the example here shown, at angles of the approximate order of 90° with the arm portions 3a and 4a. A 90° or right-angle bend is not closely critical, and a permitted increase of up to at least 10° or thereabouts is satisfactory. Actually, an angle of about 100° has been found very desirable and typical, and such a variation, or other functionally equivalent modifications, are intended to be included within the expression "approximately right angles" as used in the claims.

The shoulders 5 and 6 are angularly offset or bent, in opposite directions, through small angles, e.g., 11° or thereabouts, from the plane of the bight and the arm portions 3a and 4a (FIG. 2). The shoulders 5 and 6 will be seen to be substantially parallel to one another.

Turned forwardly (away from bight 2) and then outwardly (apart from one another) from the inner ends of the angularly bent arm portions or shoulders 5 and 6 are interengageable hook formations 7 and 8, which extend back toward and across the plane of the bight and arm portions 3a and 4a at acute angles relative to said plane. These angles may be, for example, around 35°, though they may be modified to suit particular circumstances. The curved but somewhat angular bight portions 9 of the hook formations are thus laterally offset from one another, as viewed for instance in FIG. 2, so that these bight or angle portions 9 of the hooks are not directly opposed and will not engage one another when the ring arms are pressed together, and so that, instead, the angularly bent shank portions 10 of the hook formations will interengage and cam one another laterally apart, thereby permitting said portions 10 to slide by one another, accompanied by a necessary elastic deformation of the ring (the arm portions 3a and 4a being forced in opposite directions from their common plane) until the ends of the shank portions clear one another. The arms 3 and 4 then spring or snap back toward a common plane, and the hook formations interengage or interlock to retain the arms against separation. Thus interlocked, the arms are very tightly secured against expansion pressure.

In the position of FIG. 1, the hook formations are well spaced, and they are shaped to guide the ring about the objects to be fastened. The ring may have a slight snapping action over the devices which it is to straddle. Furthermore, when the arms of the ring are brought together, the inner surfaces of the shoulders 5 and 6 tend to guide and compress material contained therein toward the inside of the ring. When the ring is closed, the bight 2 tends to straighten out (FIG. 3), but maintains a pressure on the material gathered inside the ring, tending to keep the ring tight although the material inside the ring may have varied dimensions. When the ring is closed and hooked together, it is very secure, and locking strength actually increases if an attempt is made to pull the ring apart since the hook formations do not deform, straighten out, or slip, and instead develop an even tighter locking action.

FIGS. 5 to 9 show a slight modification. Here, the ring has arms 13 and 14, including convergent arm portions 13a and 14a connected by a bight 12. Arms 13 and 14 include shoulders 15 and 16, respectively, and the arm 13 and its respective shoulder 15 are in a plane through the bight 12 which is at a small or slight acute angle to the plane through the other arm 14 and shoulder 16 and the bight 12. In other words, the arms 13 and 14 are slightly angularly bent apart relative to the bight 12. In another manner of speaking, the portion 13a and shoulder 15 of the one arm are in a plane containing the bight 12 which is disposed at a small angle relative to the corresponding plane of the other arm 14 and shoulder 16, whereby said arm planes are inclined in opposite directions from an imaginary intermediate plane containing the bight and intersecting said angle.

The inner ends of the shoulders 15 and 16 have hook formations 17 and 18 which to all intents and purposes are substantially identical to the hook formations 7 and 8 of the first described embodiment. From FIG. 6, it will be seen that the bights or angles of the hook formations 17 and 18 are, because the arms 13 and 14 are in different angular planes, laterally offset from one another, so they will not engage when the ring is closed. Instead, they will clear, and the hook shank portions 20 will engage and cam the hooks apart until they snap closed, as in the embodiment of FIGS. 1–4. The hook formations 17 and 18 will be seen to extend toward and across the previously defined intermediate plane at acute angles, so that when the arms are pressed together, the hook formations engage and deflect the inner ends of the shoulders 15 and 16 laterally away from one another to permit the hook formations to clear and the inner ends of the shoulders to be overlapped. Then when the arms are released, the hook formations interengage and interlock to retain the arms against separation.

Usually, the hook ends are cut off square. FIG. 10 shows the optional possibility of cutting the end off of a hook shank 30 on a diagonal, as at 31, to provide a sharpened hook.

This invention is not to be limited by the embodiments shown in the drawing and described in the description, which are given by way of example and not of limitation, but in accordance with the scope of the appended claims.

I claim:
1. A ring fastener comprising:
   a body formed from a length of wire and including a pair of arms having normally convergent arm portions and a resiliently flexible bight portion integrally joining the convergent ends of said arms,
   said arms being disposed approximately in a common plane containing said bight portion,
   the other end portions of said arms extending inwardly toward one another at approximately right angles relative to the respective convergent arm portions and then laterally of the respective inwardly extending portions at an acute angle relative thereto and away from said bight portion to form inwardly directed shoulders on the arms and outwardly turned hook formations on the inner ends of and disposed in intersecting planes containing said shoulders, respectively,
   said hook formations being normally spaced to define a gap therebetween, and
   said shoulders being angularly offset to opposite sides of said plane and said hook formations extending toward and across said plane at an acute angle relative to the plane, whereby when said arms are sprung toward one another, said hook formations engage and deflect the inner ends of said shoulders laterally away from one another to permit the inner ends of the shoulders to be overlapped, and when said arms are released, said hook formations interlock to retain the arms against separation.

2. A ring fastener comprising:
   a body formed from a length of wire and including a pair of arms having normally convergent arm portions and a resiliently flexible bight portion integrally joining the convergent ends of said arms,
   the other end portions of said arms extending inwardly toward one another at approximately right angles relative to the respective convergent arm portions and then laterally of the respective inwardly extending portions at an acute angle relative thereto and away from said bight portion to form inwardly directed shoulders on the arms and outwardly turned hook formations on the inner ends of and disposed in planes containing said shoulders, respectively,
   said hook formations being normally spaced to define a gap therebetween,
   said first-mentioned portion and shoulder of each arm being disposed in a plane containing said bight portion and said plane of one arm being disposed at a small angle relative to said plane of the other arm, whereby said arm planes are inclined in opposite directions from an intermediate plane containing said bight portion and bisecting said angle, and
   said hook formations extending toward and across said intermediate plane at an acute angle relative to said latter plane, whereby when said arms are sprung toward one another, said hook formations engage and deflect the inner ends of said shoulders laterally away from one another to permit the inner ends of the shoulders to be overlapped, and when said arms are released, said hook formations interlock to retain said arms against separation.

References Cited by the Examiner

UNITED STATES PATENTS

| | | | |
|---|---|---|---|
| 305,103 | 9/1884 | Newton | 50—306 |
| 509,529 | 11/1893 | Harris | 24—237 X |
| 1,219,702 | 3/1917 | Childress | 24—26 |
| 2,402,211 | 6/1946 | Satterlee | 50—314 |

FOREIGN PATENTS 204,763  10/1923  Great Britain.

WILLIAM FELDMAN, *Primary Examiner*.